(12) United States Patent
Johnson

(10) Patent No.: US 9,131,211 B2
(45) Date of Patent: Sep. 8, 2015

(54) IMAGING SYSTEMS WITH VERIFICATION PIXELS

(71) Applicant: Semiconductor Components Industries, LLC, Phoenix, AZ (US)

(72) Inventor: Richard Scott Johnson, Boise, ID (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 12 days.

(21) Appl. No.: 14/034,365

(22) Filed: Sep. 23, 2013

(65) Prior Publication Data

US 2014/0094993 A1 Apr. 3, 2014

Related U.S. Application Data

(60) Provisional application No. 61/705,582, filed on Sep. 25, 2012.

(51) Int. Cl.
*B60W 30/08* (2012.01)
*H04N 17/00* (2006.01)

(52) U.S. Cl.
CPC ............ *H04N 17/002* (2013.01); *B60W 30/08* (2013.01)

(58) Field of Classification Search
CPC ............................. H04N 17/002; B60W 30/08
USPC ................................ 701/1; 348/175, 176, 187
See application file for complete search history.

(56) References Cited

U.S. PATENT DOCUMENTS

| | | | |
|---|---|---|---|
| 6,388,245 B1 | 5/2002 | Lee | |
| 6,577,748 B2 | 6/2003 | Chang | |
| 7,141,774 B2 | 11/2006 | Yuyama | |
| 7,747,087 B2 | 6/2010 | Laude et al. | |
| 7,791,664 B1 | 9/2010 | Koifman | |
| 8,094,215 B2* | 1/2012 | Richardson | 348/187 |
| 2008/0158363 A1* | 7/2008 | Myers | 348/187 |
| 2008/0169414 A1* | 7/2008 | Li | 250/208.1 |
| 2008/0225144 A1 | 9/2008 | Mauritzson | |
| 2008/0303905 A1* | 12/2008 | Chinnaveerappan | 348/187 |
| 2010/0283875 A1 | 11/2010 | Koifman | |
| 2013/0027565 A1* | 1/2013 | Solhusvik et al. | 348/187 |
| 2013/0083204 A1* | 4/2013 | Solhusvik et al. | 348/187 |

FOREIGN PATENT DOCUMENTS

| | | |
|---|---|---|
| EP | 1881692 | 1/2008 |
| WO | 2008036289 | 3/2008 |

OTHER PUBLICATIONS

Martinussen, U.S. Appl. No. 13/872,665, filed Apr. 29, 2013.
Solhusvik et al., U.S. Appl. No. 13/399,912, filed Feb. 17, 2012.

* cited by examiner

*Primary Examiner* — John Q Nguyen
*Assistant Examiner* — Anshul Sood
(74) *Attorney, Agent, or Firm* — Treyz Law Group; Kendall P. Woodruff

(57) ABSTRACT

An imaging system may include a pixel array having a plurality of image pixels and a plurality of test pixels. The test pixels may each include a photodiode configured to receive a test voltage. For example, the photodiodes of test pixels may be coupled to a bias voltage supply line or the photodiodes may receive test voltages via a column readout line or a row control line. The test voltage may be output on a column line associated with the column of pixels in which the test pixel is located. Verification circuitry may compare the output test signal with a predetermined reference signal to determine whether the imaging system is functioning properly. If an output test signal does not match the expected output signal, the imaging system may be disabled and/or a warning signal may be presented to a user of the system.

20 Claims, 6 Drawing Sheets

IMAGING SYSTEMS WITH VERIFICATION PIXELS

This application claims the benefit of provisional patent application No. 61/705,582, filed Sep. 25, 2012, which is hereby incorporated by reference herein in its entirety.

BACKGROUND

This relates generally to imaging systems and, more particularly, to imaging systems that use verification circuitry to test the integrity of the imaging system.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Over the lifetime of an electronic device, image sensors in the electronic device may be prone to failure. Conventional image sensors are sometimes provided with methods for testing the functionality of the image sensor when the electronic device is in stand-by mode. However, failure or error may occur during active operation of the electronic device or may otherwise be undetectable during stand-by mode.

It would therefore be desirable to provide improved imaging systems with capabilities to verify the functionality of the imaging system.

DETAILED DESCRIPTION

Figure 1:
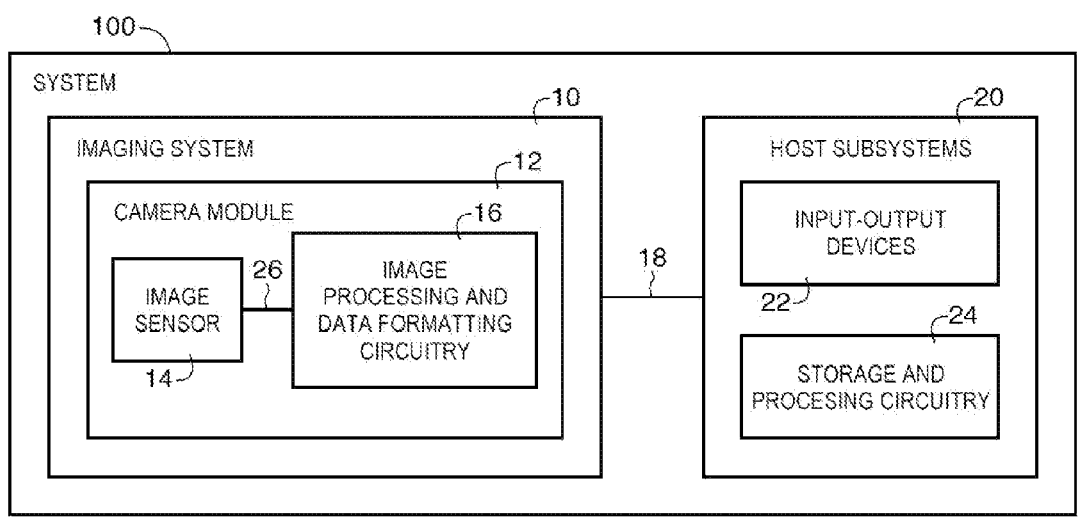
FIG. 1 is a diagram of an illustrative system that includes an imaging system and a host subsystem in accordance with an embodiment of the present invention.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help as unintended drilling (e.g., crossing lane markers) or to otherwise assist in the safe operation of a vehicle during any normal operation mode of the vehicle.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. It may also be desirable to continuously monitor the status of imaging system components during operation of the imaging system, particularly in situations in which vehicle safety may be influenced by the quality of imaging data provided by the imaging system. Imaging systems may be provided having this type of on-the-fly (e.g., real-time) verification capability.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). An image sensor may include verification circuitry for verifying the correct operation of the image sensor. For example, in situations in which images captured by the image sensors are used as input to an active control system for a vehicle, verification circuitry in the image sensor may be configured to generate verification image data and compare the verification image data with an expected result so that incorrect image sensor data is not input into the active control system.

In some configurations, verification image data may be compared with a predetermined standard stored in the imaging system, generated by the imaging system during operation, or stored on additional circuitry that is external to the imaging system. The predetermined standard may be an expected value, may be to mathematically determined threshold, may sometimes be referred to as a "golden" standard image, may be captured during manufacturing of the imaging system or at another suitable time (e.g., during startup or shutdown of the imaging system), and/or may include one or more mathematically or experimentally determined ranges to which verification image data may be compared.

Based on the result of the comparison of the verification image data with the predetermined standard or predetermined pattern, an imaging system may be disabled (e.g., if the result is outside the predetermined range or if the result does not match a reference signal) or may continue to operate normally (e.g., if the result is within the predetermined range or if the result matches a reference signal). In some arrangements, the imaging system may remain in operation but an indicator may be presented to users to inform the users that the imaging system needs further inspection and/or repair (e.g., the imaging system may present a "check imaging system" indication when the results of verification operations indicate a potential problem in the operation of the imaging system).

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1 system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 is path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, all audible warning, or other warning) in the event that verification data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

During operation of imaging system 10, camera module 12 may continuously capture and provide image frames to host subsystem 20. During image capture operations, verification circuitry associated with image sensor 14 may be occasionally operated (e.g., following each image frame capture, following every other image frame capture, following every fifth image frame capture, during a portion of an image frame capture, etc.). Images captured when verification circuitry is operated may include verification data containing verification information. Verification data may be provided to image processing circuitry 16 and/or storage and processing circuitry 24. Image processing circuitry 16 may be configured to compare the verification data to a predetermined data set stored on image processing circuitry 16. Following the comparison, image processing circuitry 16 may send status information or other verification information to host subsystem 20.

Figure 2:
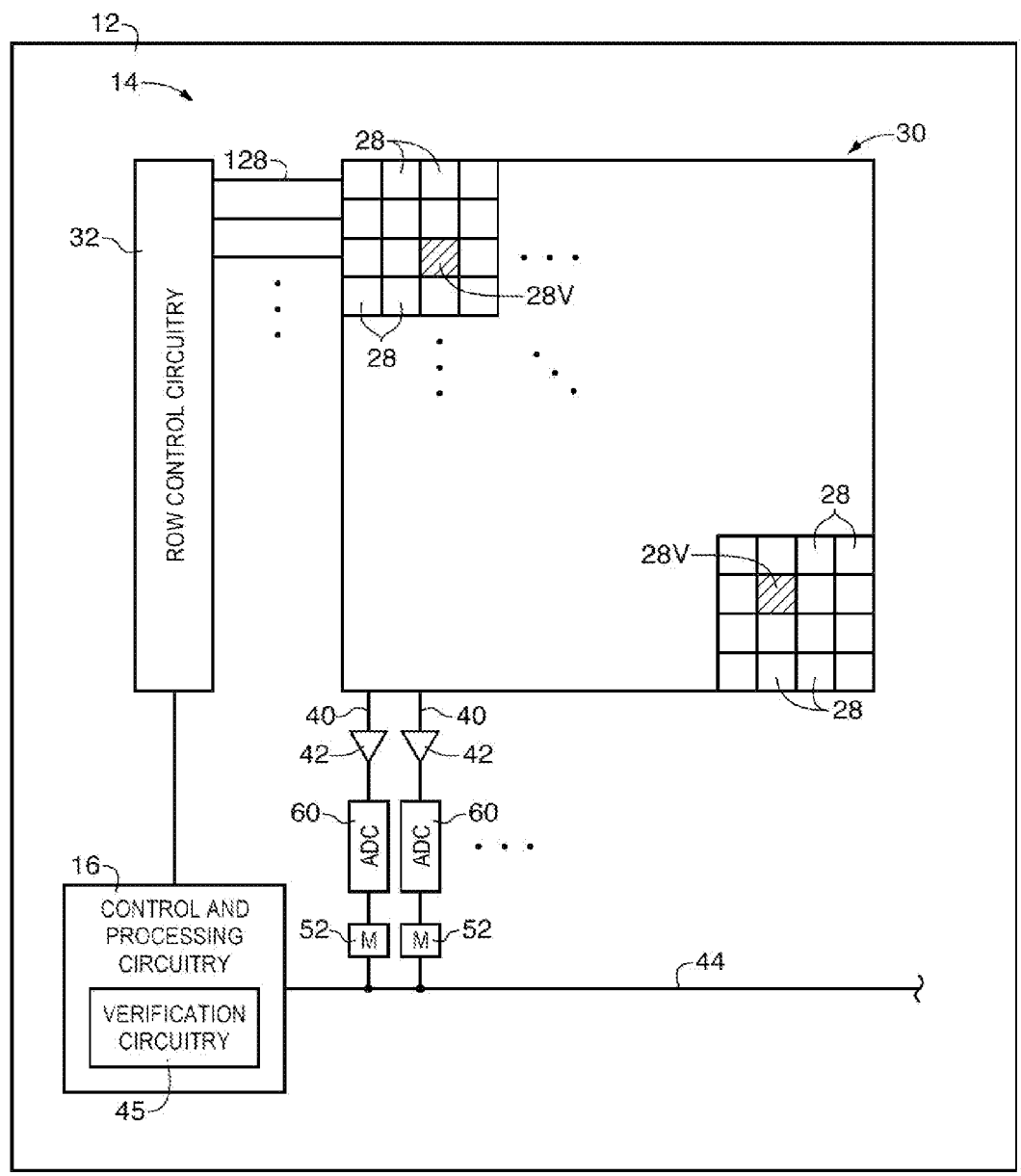
FIG. 2 is a diagram of an illustrative image sensor having an array of image pixels, verification circuitry, and control circuitry coupled to the array of image pixels in accordance with an embodiment of the present invention.

An example of an arrangement for camera module 12 is shown in FIG. 2. As shown in FIG. 2, camera module 12 includes image sensor 14 and control and processing circuitry 16. Image sensor 14 may include a pixel array such as array 30 of pixels 28. Control circuitry 16 may be coupled to row control circuitry 32 and global data path 44. Row control circuitry 32 may receive row addresses from control circuitry 16 and may supply corresponding row control signals to image pixels 28 over control paths 128. One or more conductive lines such as column lines 40 may be coupled to each column of image pixels 28 in image pixel array 30. Column lines 40 may be used for reading out image signals from image pixels 28 and for supplying bias signals (e.g., bias currents or bias voltages) to image pixels 28. During image pixel readout operations, a pixel row in image pixel array 30 may be selected using row control circuitry 32 and image data associated with image pixels 28 of that pixel row may be read out on column lines 40.

Each column line 40 may include column circuitry such as column amplifiers 42, analog-to-digital converter (ADC) circuit 60, and memory circuits 52. ADC circuits 60 may be used to convert analog signals on column lines 40 into corresponding digital signals before output to memory circuits 52.

Array 30 may have any number of rows and columns. In general, the size of array 30 and the number of rows and columns in array 30 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Camera module 12 may include verification circuitry such as verification circuitry 45. Verification circuitry 45 may receive verification data from one or more pixels in array 30 such as verification pixels 28V. For example, one or more test signals may be injected into the photodiode of verification pixel 28V. The test signal may be output on an associated one of column lines 40 and converted to a digital test signal by ADC circuit 60. Control circuitry 16 (e.g., verification circuitry 45) may compare the output test signal with a reference signal and may evaluate the result to determine whether or not image sensor 14 is functioning properly.

There may be any suitable number of verification pixels 28V in array 30, and verification pixels 28V may be located in any suitable location in array 30. For example, there may be one, two, three, four, or more than four verification pixels 28V in pixel array 30. Verification pixels 28V may be grouped together as verification pixel blocks, may be interspersed between image pixels 28, may form one or more whole rows and/or columns in array 30, etc.

Test signals from verification pixels 28V may be read out at any suitable time. If desired, test signals from verification pixels 28V may be read out during normal operation of imaging system 10 or may be read out during a "start up" period during which the imaging system is powering on. Test signals from verification pixels 28V may, for example, be read out with image signals from image pixels 28 during every image frame and/or may be read out every few image frames (e.g., every fourth image frame, every tenth image frame, etc.).

Row control circuitry 32 may generate signals on paths 128 as desired. For example, row control circuitry 32 may generate reset signals on reset control lines in paths 128, transfer signals on transfer control lines in paths 128, and row select (e.g., row readout) signals on row select control lines in paths 128 to control the operation of array 30. If desired, row control circuitry 32 and array 30 may be integrated together in a single integrated circuit (as an example).

Test voltages may be injected into verification pixels 28V using existing pixel circuitry and/or using additional pixel circuitry. For example, the photodiodes of verification pixels 28V may be coupled to a voltage supply line or may be electrically coupled to a designated test voltage supply line via an adjacent column output line or an adjacent row control line.

Figure 3:
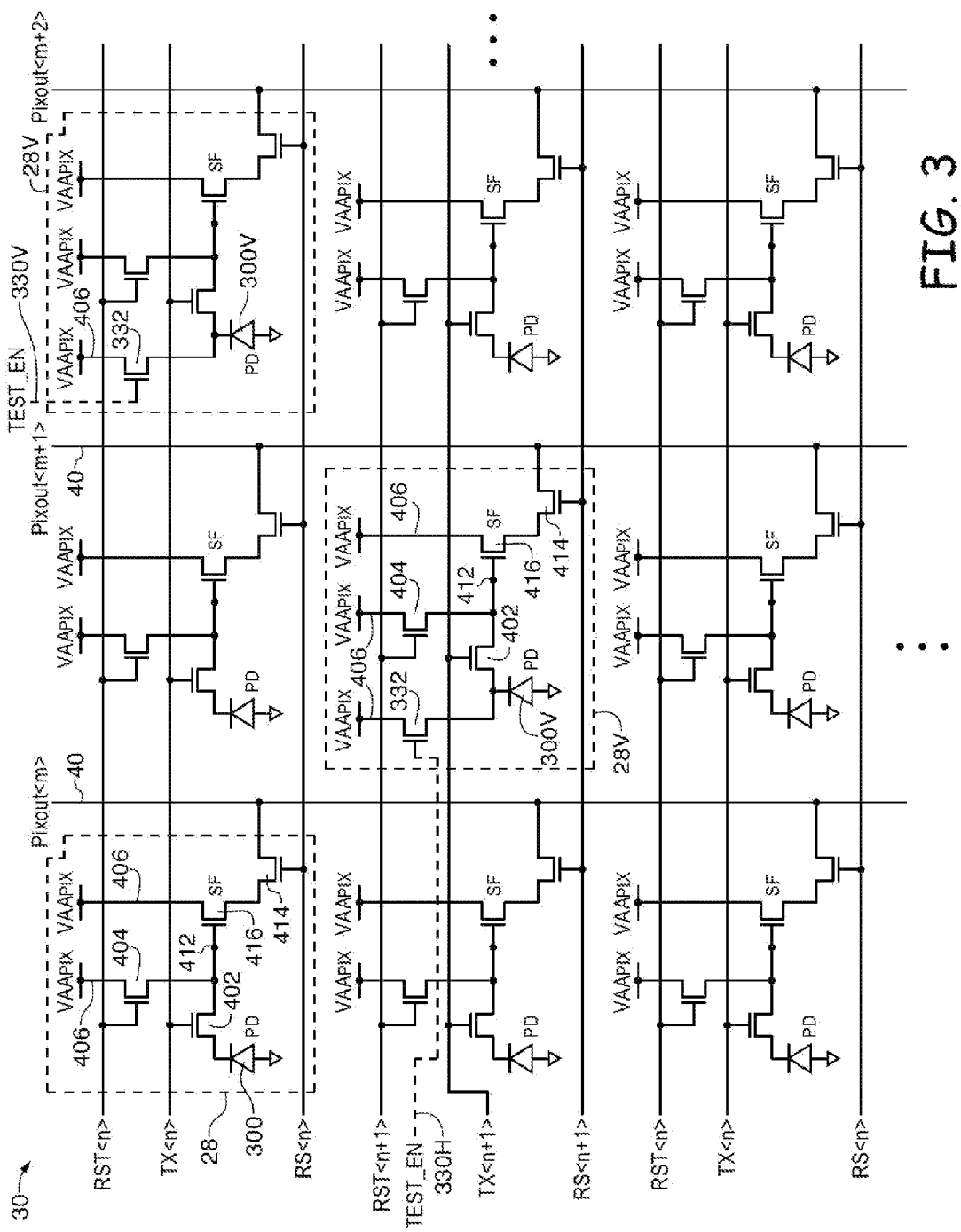
FIG. 3 is a diagram of an illustrative image pixel array having at least one verification pixel that includes a photodiode coupled to a voltage supply line in accordance with an embodiment of the present invention.

FIG. 3 is an illustrative example of circuitry that may be used to inject test signals into verification pixels such as verification pixels 28V of pixel array 30. As shown in FIG. 3, pixel array 30 may include a plurality of image pixels 28 and one or more verification pixels 28V (sometimes referred to as test pixels 28V).

Image pixels 28 and test pixels 28V may each include photosensitive elements such as photosensitive elements 300 and 300V, respectively (e.g., a photodiode or other light gathering element), coupled to a floating diffusion node 412 through transfer gate 402. Floating diffusion node 412 may be a doped semiconductor region (e.g., to region in a silicon substrate that is doped by ion implantation, impurity diffusion, or other doping process). Transfer gate 402 may have a gate terminal that is controlled by signal TX. Reset transistor 404 may be coupled between bias voltage supply line 406 (e.g., a positive power supply line on which positive power supply voltage $V_{AAPIX}$ is provided) and floating diffusion node FD. Reset transistor 404 may have a gate terminal that is controlled using signal RST.

Source follower transistor 416 and row select (read) transistor 414 may be coupled in series between bias voltage line 406 and column output line 40. Source follower transistor 416 may have a gate terminal that is coupled to floating diffusion 412, whereas read transistor 414 may have a gate terminal that is controlled using row select signal RS. Pixels 28 located along the same row may receive a common row select signal RS, whereas pixels 28 located along the same column may be coupled to separate respective row select lines.

During image capture operations, image pixels 28 may be operated as follows. Before an image is acquired, reset control signal RST may be asserted. Asserting signal RST turns on reset transistor 404 and resets floating diffusion node 412 (sometimes referred to as a charge storage node) to $V_{AAPIX}$. Reset control signal RST may then be deasserted to turn off reset transistor 404. Incoming light may be collected by photodiode 300 after passing through a color filter element. Photodiode 300 generates charge (e.g., electrons) in response to receiving impinging photons. The amount of charge that is collected by photodiode 300 depends on the intensity of the impinging light and the exposure duration (or integration time).

At the end of the integration period, transfer signal TX may be pulsed to transfer charge from photodiode 300 to charge storage region 412. When it is desired to read out the charge stored in charge storage region 412, signal RS may be asserted to turn on reset transistor 404 and thereby convey the image signal (e.g., an output signal having a magnitude that is proportional to the amount of charge at floating diffusion node 412) to column output path 40.

As shown in FIG. 3, verification pixels 28V may have similar circuitry to that of image pixels 28 in pixel array 30. However, photodiodes 300V of verification pixels 28V may be connected to a voltage supply line such as voltage supply line 406. A transistor such as transistor 332 may be coupled between voltage supply line 406 and photodiode 300V. Transistor 332 may have a gate that is controlled using a control signal TEST_EN. When it is desired to readout test signals from verification pixels 28V, signal TEST_EN may be asserted on control line 330H to turn transistor 332 on and thereby route a known voltage such as $V_{AAPIX}$ or other suitable voltage to photodiode 300V.

Because the output signals from pixels 28V pass through the same pixel-to-output data path (i.e., the same pixel signal chain) as image signals from pixels 28 in array 30, the output signals from pixels 28V may be used to determine whether or not the pixel-to-output data paths of pixel array 30 are working properly. For example, verification circuitry such as verification circuitry 45 of FIG. 2 may be used to compare the output test signals with reference signals to determine whether or not imaging system 10 is functioning properly.

The example of FIG. 3 in which control line 330H for controlling transistor 332 is a horizontal control line is merely illustrative. If desired, transistor 332 may be controlled using a vertical control line such as control line 330V (sometimes referred to as a column control line) In general, control signal TEST_EN may be routed vertically or horizontally and may be driven globally, row-by-row, or column-by-column.

If desired, test signals from verification pixels 28V may be read out during normal operation of imaging system 10. For example, test signals may be read out from verification pixels 28V at the same time that image signals are read out from image pixels 28. Test signals may be read out with every image frame or may be read out after a predetermined number of frames (e.g., every two frames, every four frames, etc.).

To replace the missing pixel information from verification pixels 28V, control and processing circuitry 16 and/or storage and processing circuitry 24 may be used to interpolate pixel values for verification pixels 28V based on pixel values from adjacent or nearby image pixels 28. Interpolating pixel values for verification pixels 28V may help prevent artifacts from appearing in images produced by imaging system 10.

This is, however, merely illustrative. If desired, test signals from verification pixels 28V may be read out during a start up period when imaging system 10 is powering on or during a shut down period when imaging system 10 is powering off. During image capture operations, verification pixels 28V having the configuration shown in FIG. 3 may be used as normal image pixels (e.g., may be used in a similar manner as surrounding image pixels 28). For example, when images are being captured using pixel array 30, signal TEST_EN may remain deasserted so that transistor 332 remains off. This allows photodiode 300V to collect charge in response to light from a scene.

In another suitable embodiment, photodiode 300V may be shorted directly to voltage supply line 406 (e.g., without transistor 332 coupled between photodiode 300V and voltage supply line 406). In this type of configuration in which photodiodes 300V are tied to a known voltage (e.g., even during image capture operations), processing circuitry 16 may be used to interpolate pixel values for verification pixels 28V.

In some configurations, image processing circuitry 16 of camera module 12 may be used to compare output test signals from verification pixels 28V with predetermined reference signals. In other configurations, host subsystem 20 may be used to compare output test signals with predetermined reference signals. If an output test signal does not fall within a predetermined range of a reference signal, host subsystem 20 may be configured to disable some or all of imaging system 10 and/or to issue a warning to the operator of system 100 (e.g., issue a warning to the driver of an automobile that uses system 100).

Figure 4:
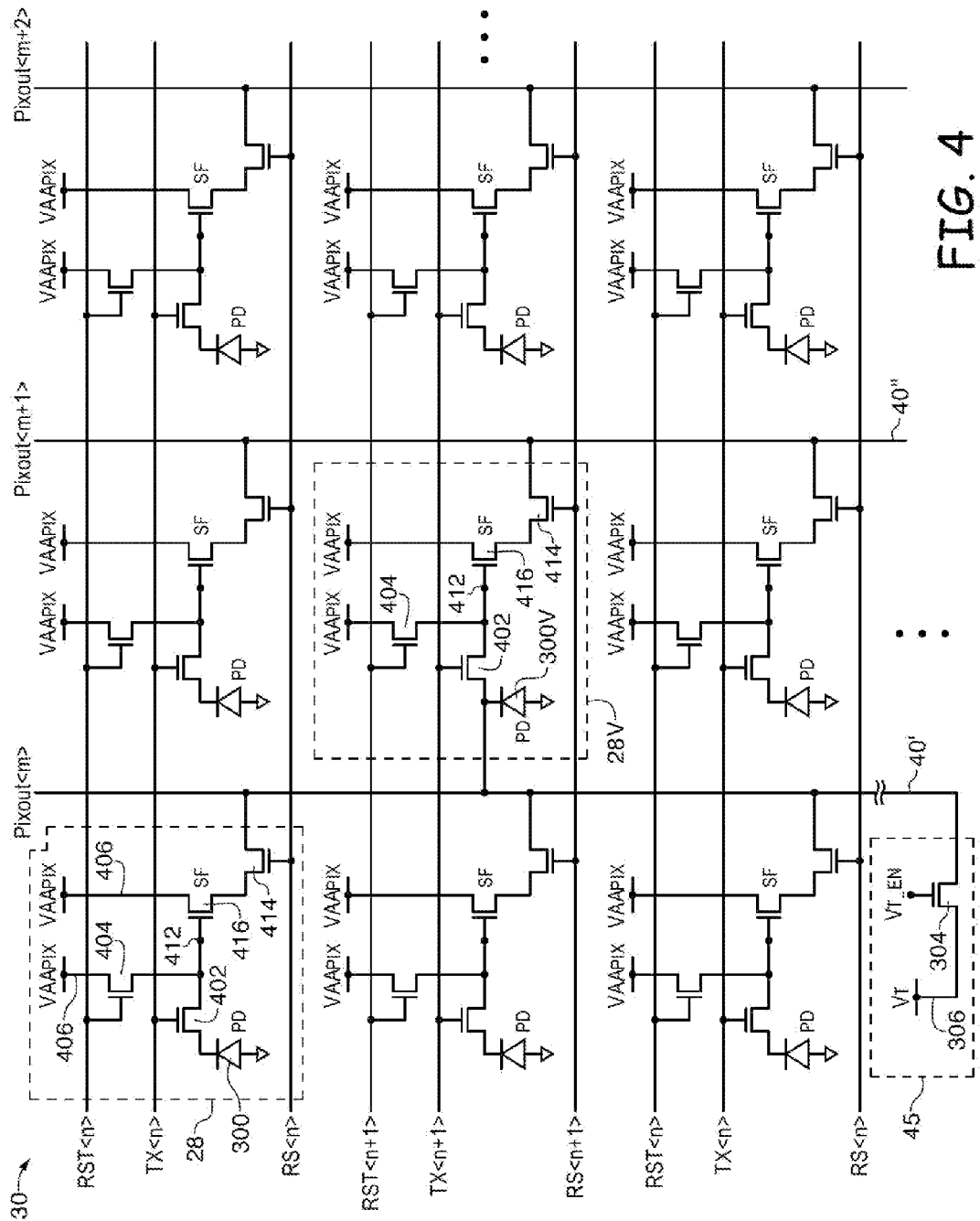
FIG. 4 is a diagram of an illustrative image pixel array having at least one verification pixel that includes a photodiode that receives a test voltage via a column output line in accordance with an embodiment of the present invention.

FIG. 4 is another illustrative example of verification circuitry that may be used to inject test signals into verification pixels such as verification pixels 28V of pixel array 30. In the example of FIG. 4, each photodiode 300V of verification pixels 28V is electrically coupled to a neighboring pixel output line 40. Pixel output line 40 may be electrically coupled to verification circuitry 45. Verification circuitry 45 may include a transistor such as verification transistor 304 coupled in series between column output line 40 and test voltage supply line 306. Verification transistor 304 may have a gate that is controlled using control signal $V_{T\_EN}$. When signal $V_{T\_EN}$ is asserted, a known test voltage $V_T$ from voltage supply line 306 may be routed to photodiode 300V via column output line 40.

When it is desired to read out test signals from verification pixels 28V (e.g., during a start up period, a shut down period, or other suitable period), row select transistors 414 may be turned off so that column output lines 40 are not being driven by source follower 416. While row select transistors 414 are turned off, verification transistor 304 may be turned on to drive column output line 40 (e.g., column output line 40' of FIG. 4) at test voltage $V_T$ and thereby inject test voltage $V_T$ onto photodiode 300V of verification pixel 28V. Transfer gate control signal TX may then be asserted to turn on transfer transistor 402 of pixel 28V. When transfer transistor 402 is turned on, the test signal that has been injected onto photodiode 300V may be transferred to charge storage node 412. Verification transistor 304 may be deasserted, and row select transistor 414 may be subsequently asserted to turn on row select transistor 414 of pixel 28V and to thereby convey a signal associated with the charge stored on node 412 to appropriate column output line 40 (e.g., column output line 40" of FIG. 4).

If desired, verification transistors 304 may be turned off during normal imaging operations to ensure that column output lines 40 are driven by source follower transistors 414 rather than verification circuitry 45.

For simplicity, the illustrative example of FIG. 4 only shows one column in pixel array 30 having a verification pixel 28V. However, it should be understood that there may be one, two, three, four, five, or more than five verification pixels 28V located in one or more columns of pixel array 30. If desired, the number of columns in pixel array 30 that include at least one verification pixel 28V may correspond to the number of verification transistors 304. Each verification transistor 304 may be used to selectively control when test voltage $V_T$ is routed from voltage supply line 306 to a respective photodiode 300V of a verification pixel 28V.

The output signals from pixels 28V may be used to determine whether or not the pixel-to-output data paths of pixel array 30 are working properly. For example, verification circuitry such as verification circuitry 45 of FIG. 2 may be used to compare the output test signals with reference signals to determine whether or not imaging system 10 is functioning properly. If an output test signal does not fall within a predetermined range of a reference signal, host subsystem 20 may be configured to disable some or all of imaging system 10 and/or to issue a warning to the operator of system 100 (e.g., issue a warning to the driver of an automobile that uses system 100).

Figure 5:
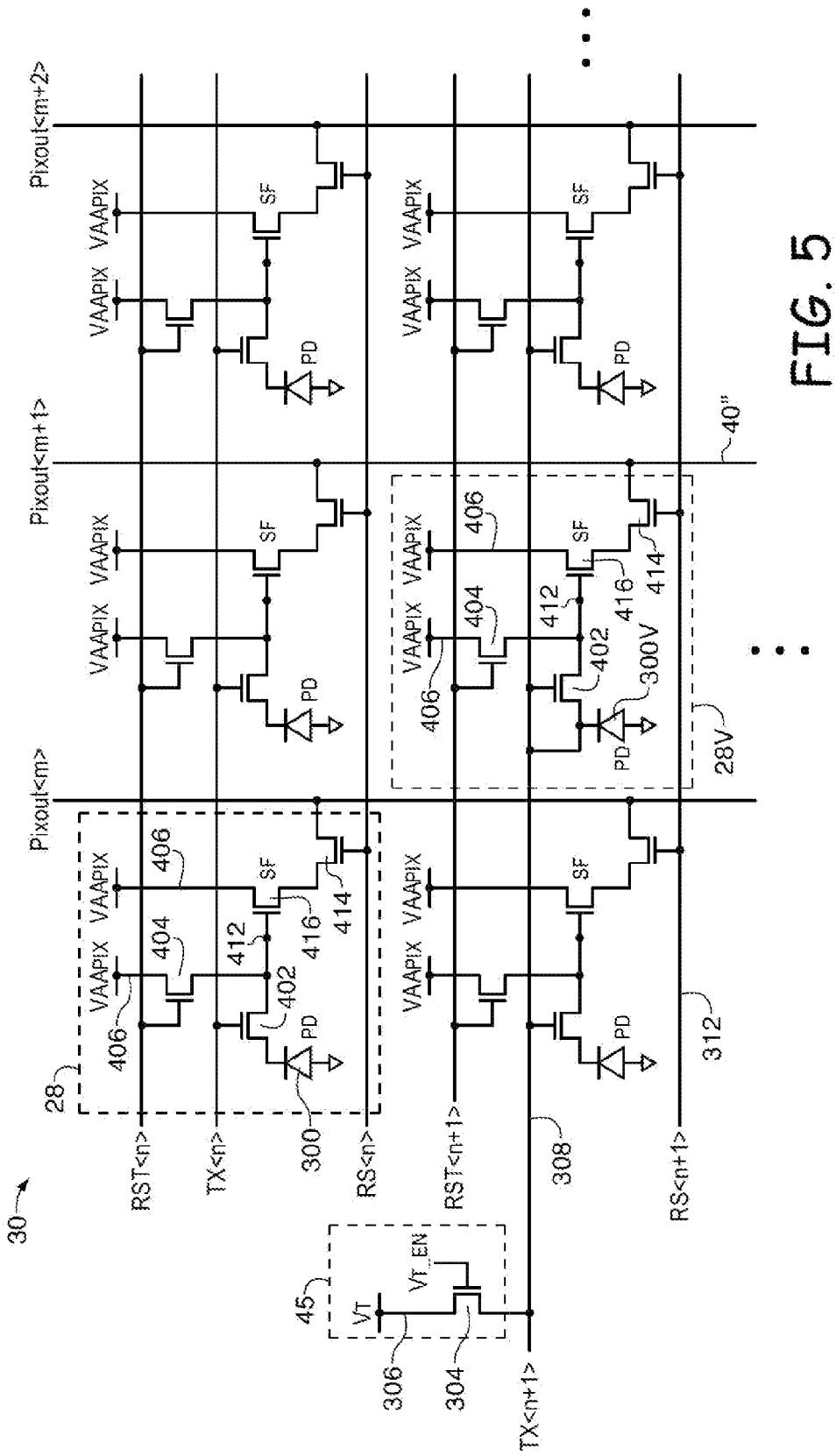
FIG. 5 is a diagram of an illustrative image pixel array having at least one verification pixel that includes a photodiode that receives a test voltage via a row control line in accordance with an embodiment of the present invention.

FIG. 5 is another illustrative example of circuitry that may be used to inject test signals into verification pixels such as verification pixels 28V of pixel array 30. As shown in FIG. 5, photodiodes 300V of verification pixels 28V may be electrically coupled to verification circuitry 45 via a row control line such as row control line 308. Row control line 308 may be coupled to a voltage supply line such as voltage supply line 306. A verification transistor such as verification transistor 304 may be coupled in series between voltage supply line 306 and transfer gate control line 308. The gate of verification transistor 304 may be controlled by control signal $V_{T\_EN}$.

The example of FIG. 5 in which photodiode 300V is coupled to transfer gate control line 308 is merely illustrative. In general, photodiodes 300V may be coupled to any suitable row control line such as reset gate control line 310, row select control line 312, a dual conversion gain control line (e.g., in configurations where pixels 28 include dual conversion gain circuitry), or other suitable horizontal control line.

When it is desired to read out test signals from verification pixels 28V (e.g., during a start up period, a shut down period, or other suitable period), verification transistor 304 may be turned on to drive row control line 308 at test voltage $V_T$ and to thereby inject test voltage $V_T$ onto photodiode 300V of verification pixel 28V. Following charge injection, control signal $V_{T\_EN}$ may be deasserted to turn off verification transistor 304. Transfer gate control signal TX may then be asserted to turn on transfer transistor 402 of pixel 28V. When transfer transistor 402 is turned on, the test signal that has been injected onto photodiode 300V may be transferred to charge storage node 412. Row select signal RS may then be asserted to turn on row select transistor 414 of pixel 28V to thereby convey an output test signal associated with the charge stored on node 412 to the appropriate column output line 40 (e.g., column output line 40" of in FIG. 5).

If desired, verification transistors 304 may be turned off during normal imaging operations to ensure that row control lines 40 are driven by the appropriate row control signals rather than test voltage $V_T$.

For simplicity, the illustrative example of FIG. 5 only shows one row in pixel array 30 having a verification pixel 28V. However, it should be understood that there may be one, two, three, four, five, or more than five verification pixels 28V located in one or more rows of pixel array 30. If desired, the number of rows in pixel array 30 that include at least one verification pixel 28V may correspond to the number of verification transistors 304. Each verification transistor 304 may be used selectively control when test voltage $V_T$ is routed from voltage supply line 306 to a respective photodiodes 300V of a verification pixel 28V.

The output signals from pixels 28V may be used to determine whether or not the pixel-to-output data paths of pixel array 30 are working properly. For example, verification circuitry such as verification circuitry 45 of FIG. 2 may be used to compare the output test signals with reference signals to determine whether or not imaging system 10 is functioning properly. If an output test signal does not fall within a predetermined range of a reference signal, host subsystem 20 may be configured to disable some or all of imaging system 10 and/or to issue a warning to the operator of system 100 (e.g., issue a warning to the driver of an automobile that uses system 100).

The illustrative examples of FIGS. 3, 4, and 5 in which image pixels 28 and verification pixels 28V are each provided with respective floating diffusion nodes and readout circuitry (i.e., readout transistors) are merely illustrative. If desired, image pixels 28 and verification pixels 28V may have shared pixel architectures in which two or more photodiodes share the same floating diffusion node and readout transistors. For example, two photodiodes, four photodiodes, or any other suitable number of photodiodes may share one or more pixel elements (e.g., may share a floating diffusion node and one or more readout transistors).

Figure 6:
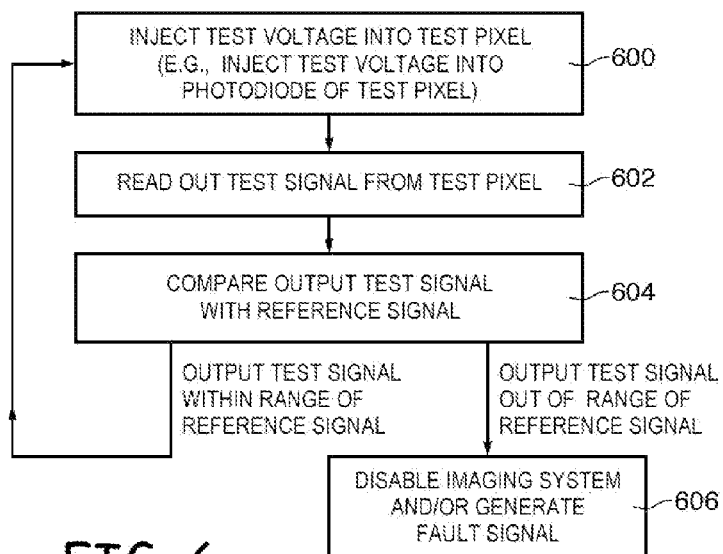
FIG. 6 is a flowchart of illustrative steps that may be used to perform verification of imaging systems in accordance with an embodiment of the present invention.

FIG. 6 is a flowchart showing illustrative steps involved in operating a system that includes an image sensor with self-verification capabilities such as image sensor 14 of FIG. 2.

At step 600, verification circuitry may be used to inject a test voltage into the pixel signal chain of a test pixel. In one suitable embodiment, this may include coupling photodiode 300V of verification pixel 28V to a bias voltage supply line (e.g., bias voltage supply line 406 of FIG. 3). In another suitable embodiment, this may include routing a test voltage from a test voltage supply line to photodiode 300V via a column output line in pixel array 30 (FIG. 4) or via a row control line in pixel array 30 (FIG. 5).

At step 602, the test signal may be read out from the test pixel. Because the test voltage is injected directly onto the photodiode of the test pixel, the test voltage may be conveyed through the same pixel-to-output signal path as image signals from image pixels 28 in the pixel array. The test signal may be output on a respective one of column readout lines 40 and provided to verification circuitry 45 via ADC circuits 60 (FIG. 2).

At step 604, verification circuitry 45 may be used to compare the output test signal with a predetermined reference signal. If the output test signal is within a predetermined range of the reference signal, processing may optionally return to step 600. For example, if verification operations are being carried out during normal operation of the image sensor, processing may return to step 600 to resume the cycle of image capture and imaging system verification while system 100 continues to operate. If verification operations are being carried out in a start up or shut down period, imaging system may proceed with start up or shut down operations as normal.

If the output test signal is not within a predetermined range of the reference signal, processing may proceed to step 606. At optional step 606, host subsystem 20 may disable some or all of imaging system 10 and, if desired, generate a fault signal such as an audible or visible failure alert signal for an operator of system 100 (e.g., an operator of a vehicle including a vehicle safety system such as system 100 may receive an alert signal). In some arrangements, imaging system 10 may remain in operation but an indicator may be presented to the operator to inform the operator that the imaging system needs further inspection and/or repair (e.g., the imaging system may present a "check imaging system" indication when the results of verification operations indicate a potential problem in the operation of the imaging system).

Figure 7:
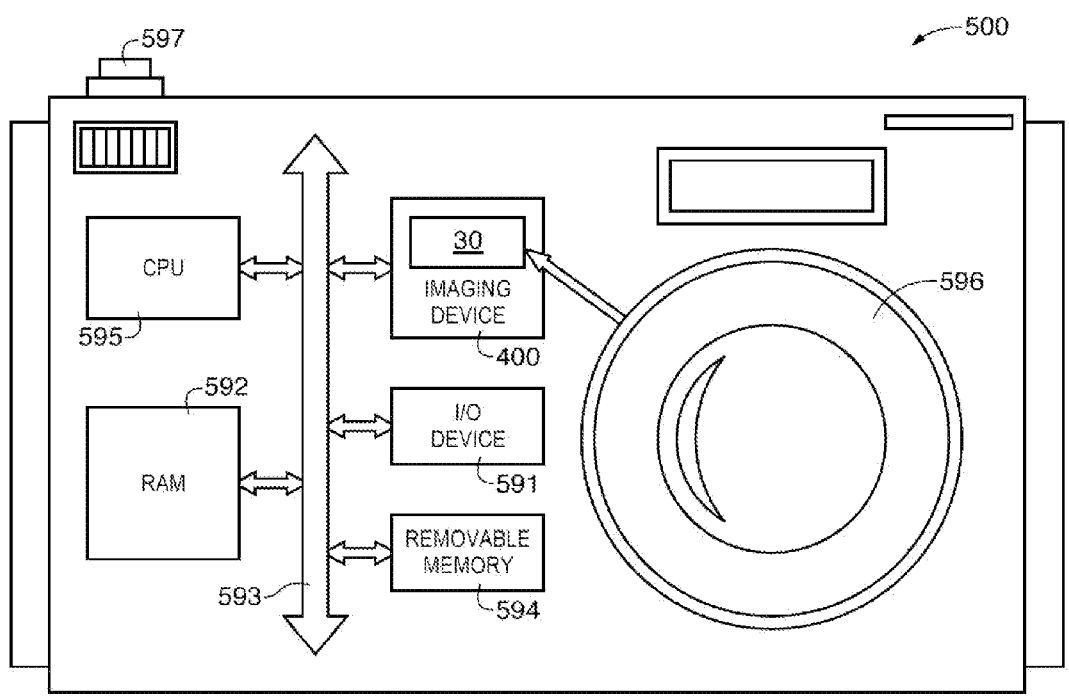
FIG. 7 is a block diagram of a system employing the embodiments of FIGS. 1-6 in accordance with an embodiment of the present invention.

FIG. 7 shows in simplified form a typical processor system 500, such as a digital camera, which includes an imaging device 400. Imaging device 400 may include a pixel array 30 having pixels of the type shown in FIG. 2 (e.g., pixel array 30 may be an array of image pixels 28) formed on an image sensor SOC. Pixel array 30 may include pixel signal chain verification circuitry as described above. The pixel signal chain verification circuitry may be configured to inject a test signal into the photodiodes of one or more verification pixels (sometimes referred to as test pixels). A test signal may be read out during normal image capture operations or may be read out during a start up or shut down period of the imaging system. Verification circuitry may compare the output test signal with a reference signal to determine whether the circuit elements in the pixel signal chain are functioning properly.

Processor system 500 is exemplary of a system having digital circuits that may include imaging device 400. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 500, which may be a digital still or video camera system, may include a lens such as lens 596 for focusing an image onto a pixel array such as pixel array 30 when shutter release button 597 is pressed. Processor system 500 may include a central processing unit such as central processing unit (CPU) 595. CPU 595 may be a microprocessor that controls camera functions and one or more image flow functions and communicates with one or more input/output (I/O) devices 591 over a bus such as bus 593. Imaging device 400 may also communicate with CPU 595 over bus 593. System 500 may include random access memory (RAM) 592 and removable memory 594. Removable memory 594 may include flash memory that communicates with CPU 595 over bus 593. Imaging device 400 may be combined with CPU 595, with or without memory storage, on a single integrated circuit or on a different chip. Although bus 593 is illustrated as a single bus, it may be one or more buses or bridges or other communication paths used to interconnect the system components.

Various embodiments have been described illustrating an imaging and response system (see, e.g., system 100 of FIG. 1) including an imaging system and host subsystems. An imaging system may include one or more image sensors. Each image sensor may include an array of image pixels formed on a semiconductor substrate. Each image pixel may include one or more photosensitive elements configured to convert incoming light into electric charges.

An imaging system may include verification circuitry. The verification circuitry may inject a test voltage into the pixel signal chain of a test pixel. The test voltage may be output on a column line associated with the column of pixels in which the test pixel is located. The test signal may be provided to an associated column ADC circuit for conversion from an analog test signal to a digital test signal. Verification circuitry may compare the digital output test signal with a predetermined reference signal to determine on-the-fly whether the imaging system is functioning properly (e.g., to determine whether column ADC circuits or other circuit elements in the pixel signal chain are working properly). If the output test signals do not match the expected output signals, or if the output test signals are outside of a predetermined range of the expected output signals, the imaging system may be disabled and/or a warning signal may be presented to a user of the system.

In one suitable embodiment, the photodiode of a verification pixel may be coupled to a bias voltage supply line. In another suitable embodiment, verification circuitry may inject a test voltage onto the photodiode of a verification pixel via an adjacent column output line or via an adjacent row control line. Processing circuitry in the system may be configured to interpolate a pixel value for the test pixel (e.g., a pixel value corresponding to image data gathered from a scene) such that image quality is not negatively affected by self-verification operations.

The foregoing is merely illustrative of the principles of this invention which can be practiced in other embodiments.

What is claimed is:

1. An image sensor, comprising:
    a pixel array having a plurality of image pixels arranged in rows and columns, wherein at least one row of image pixels includes a test pixel and wherein the test pixel has a photodiode configured to receive a test voltage;
    a row control line coupled to a pixel transistor in each image pixel in the row;
    a voltage supply line configured to supply the test voltage to the photodiode via the row control line; and
    a plurality of column readout lines configured to read out image pixel signals from the image pixels and a test signal from the test pixel.

2. The image sensor defined in claim 1 further comprising verification circuitry configured to receive the test signal and to compare the test signal with a reference signal.

3. The image sensor defined in claim 2 further comprising a transistor coupled between the voltage supply line and the row control line.

4. The image sensor defined in claim 1 wherein the row control line comprises a transfer gate control line, wherein the pixel transistor comprises a transfer transistor, and wherein the transfer gate control line is coupled to a gate of the transfer transistor in each image pixel in the row.

5. The image sensor defined in claim 1 wherein the row control line comprises a reset gate control line, wherein the pixel transistor comprises a reset transistor, and wherein the reset gate control line is coupled to a gate of the reset transistor in each image pixel in the row.

6. The image sensor defined in claim 1 wherein the row control line comprises a row select gate control line, wherein the pixel transistor comprises a row select transistor, and wherein the row select gate control line is coupled to a gate of the row select transistor in each image pixel in the row.

7. The image sensor defined in claim 1 further comprising processing circuitry configured to interpolate a pixel value for the test pixel based on the image pixel signals from image pixels adjacent to the test pixel.

8. The image sensor defined in claim 1 wherein the test pixel is one of a plurality of test pixels interspersed throughout the pixel array.

9. An image sensor, comprising:
    a pixel array having a plurality of image pixels arranged in rows and columns, wherein at least one column of image pixels includes a test pixel and wherein the test pixel has a photodiode configured to receive a test voltage;
    a plurality of column readout lines configured to read out image pixel signals from the image pixels and a test signal from the test pixel, wherein a respective one of the column readout lines is directly coupled to the photodiode of the test pixel; and
    a voltage supply line configured to supply the test voltage to the photodiode via the respective one of the column readout lines.

10. The image sensor defined in claim 9 further comprising verification circuitry configured to receive the test signal and to compare the test signal with a reference signal.

11. The image sensor defined in claim 10 further comprising a transistor coupled between the voltage supply line and the respective column readout line.

12. The image sensor defined in claim 9 wherein the test pixel comprises a source follower transistor coupled to a respective second one of the column output lines, wherein the test signal is read out on the respective second one of the column output lines.

13. The image sensor defined in claim 9 further comprising processing circuitry configured to interpolate a pixel value for the test pixel based on the image pixel signals from the image pixels adjacent to the test pixel.

14. The image sensor defined in claim 9 wherein the test pixel is one of a plurality of test pixels interspersed throughout the pixel array.

15. A system, comprising:
    a central processing unit;
    memory;
    input-output circuitry; and
    an imaging device, wherein the imaging device comprises:
        a pixel array having a plurality of image pixels and at least one test pixel, wherein the image pixels and the at least one test pixel each include a photodiode,
        a bias voltage supply line configured to route a bias voltage to each image pixel and to the test pixel, wherein the photodiode of the test pixel is coupled to the bias voltage supply line via a transistor, wherein the transistor is coupled to a control line, and wherein the test pixel is configured to output a test signal in response to a control signal on the control line,
        a plurality of column readout lines configured to read out image pixel signals from the image pixels and the test signal from the test pixel; and
        verification circuitry configured to receive the test signal and to compare the test signal with a reference signal.

16. The system defined in claim 15 wherein the test pixel is configured to read out an image pixel signal during image capture operations.

17. The system defined in claim 16 wherein the test pixel is configured to read out the test signal during a start up period of the imaging device.

18. The system defined in claim 15 wherein the control line is a vertical control line.

19. The system defined in claim 15 wherein the control line is a horizontal control line.

20. The system defined in claim 15 wherein the system comprises a portion of a vehicle safety system for an automobile and wherein the vehicle safety system is configured to control at least one of the direction and speed of the automobile based on images received from the imaging system.

* * * * *